(12) United States Patent
Li et al.

(10) Patent No.: US 11,635,799 B2
(45) Date of Patent: Apr. 25, 2023

(54) NANOSECOND-SCALE POWER RESOURCE ALLOCATION METHOD AND SYSTEM FOR MICROSERVICES

(71) Applicant: SHANGHAI JIAOTONG UNIVERSITY, Shanghai (CN)

(72) Inventors: Chao Li, Shanghai (CN); Xiaofeng Hou, Shanghai (CN); Minyi Guo, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 0 days.

(21) Appl. No.: 17/052,066

(22) PCT Filed: May 19, 2020

(86) PCT No.: PCT/CN2020/090959
§ 371 (c)(1),
(2) Date: Oct. 30, 2020

(87) PCT Pub. No.: WO2021/073085
PCT Pub. Date: Apr. 22, 2021

(65) Prior Publication Data
US 2022/0317754 A1 Oct. 6, 2022

(30) Foreign Application Priority Data
Oct. 14, 2019 (CN) .......................... 201910972406.9

(51) Int. Cl.
*G06F 1/00* (2006.01)
*G06F 1/3234* (2019.01)
(Continued)

(52) U.S. Cl.
CPC .......... *G06F 1/3243* (2013.01); *G06F 1/3206* (2013.01); *G06F 1/3296* (2013.01)

(58) Field of Classification Search
CPC .... G06F 1/3243; G06F 1/3206; G06F 1/3296; G06F 1/324; G06F 1/3228; G06F 9/5094;
(Continued)

(56) References Cited

U.S. PATENT DOCUMENTS 9,875,086 B1* 1/2018 Anderson ........... G06F 11/3006
2018/0254996 A1* 9/2018 Kairali ............... H04L 67/1036
(Continued)

*Primary Examiner* — Nitin C Patel
(74) *Attorney, Agent, or Firm* — CBM Patent Consulting, LLC

(57) ABSTRACT

The invention relates to a nanosecond-scale power resource allocation method and system for microservices. In order to eliminate the macro-control delays, it uses an auto power budgeting module to distribute the limited power resource to each microservice according to its unique power-performance model. On the other side, it deploys an agile power regulation module to bypass the slow power control procedures at the server system layer. By directly invoking the voltage regulation circuit on the processor, this can remove the micro-execution delays. It also leverages a transparent mapping mechanism to coordinate the work of the auto power budgeting module and the agile power regulation module to achieve the optimal allocation of power resources. The present invention can exploit the intra-application variability brought by microservices, thus further break the energy-saving limitation of traditional data centers.

13 Claims, 3 Drawing Sheets

(51) Int. Cl.
*G06F 1/3206* (2019.01)
*G06F 1/3296* (2019.01)

(58) Field of Classification Search
CPC ............... G06F 11/3409; G06F 18/214; G06F 18/24323
See application file for complete search history.

(56) References Cited

U.S. PATENT DOCUMENTS

2018/0270122 A1* 9/2018 Brown .................... H04L 67/30
2019/0057213 A1* 2/2019 Hassan ................. H04L 41/142

* cited by examiner

NANOSECOND-SCALE POWER RESOURCE ALLOCATION METHOD AND SYSTEM FOR MICROSERVICES

TECHNICAL FIELD OF THE INVENTION

The invention relates to a technology in the field of intelligent control of power systems, specifically a method and system for microservice-oriented, nanosecond-scale power resource allocation in data centers.

TECHNOLOGY BACKGROUND

While cloud applications once have largely monolithic software architecture, container technology has recently catalyzed the shift from the monolith to microservice. Modern cloud applications of this new architectural style are formed by a myriad of highly granular services that can be managed, tested, and scaled independently. Some key attributes of microservice, such as domain-driven design and on-demand virtualization make it fit nicely to today's scale-out cloud environment. Most importantly, by partitioning large applications into many lightweight, process-level microservices, the microservice architecture can fully expose the difference and variability within applications. To characterize and utilize the intra-application variability, it is critical to devise more granular and differentiated power resource management for each microservice. However, existing power resource allocation methods suffer from macro control delays and micro execution delays. Specifically, macro control delays typically exceed 10 seconds, mainly due to the iterative and repetitive power information collection and control processes at data center level. Micro execution delays typically range from 10 to 31 milliseconds, mainly due to the slow system-level power regulation techniques at server side. As a result, existing power resource allocation methods typically take milliseconds or even seconds, making it difficult to track the intra-application variability among different microservices. This would undoubtedly hinder the agility and scalability of microservices.

BRIEF SUMMARY OF THE INVENTION

The invention proposes a nanosecond-scale power allocation method and system for microservices, which exploits fine-grained microservice variability for system efficiency. It abstracts away two major sources of delay overhead in traditional hierarchical power management frameworks. Ultimately, it can further break the limitation of energy saving by exploiting the intra-application variability in data centers.

The invention is achieved by the following technical solutions:

The present invention relates to a nanosecond-scale power resource allocation method for microservices. To eliminate the macro-control delay, it deploys an auto power budgeting method to partition the limited power resource to each microservice based on its unique power-performance model. To remove the micro execution delay, it leverages an agile power regulation approach to execute the power allocation decisions for each microservice. It also uses a transparent mapping mechanism to coordinate the work of the auto power budgeting method and the agile power regulation design for the optimal power allocation.

The auto power budgeting method includes creating a power-performance model, which profiles the relationship between the performance (i.e., response time) of different microservices and the allocated power resource in the highly dynamic environment. The power-performance models can quantify the influence of the power allocation on different microservices. This method then allocates power resources to the most influential microservices based on these profiles, such as it prioritizes the power resource budget for the most influential microservices, which can maximize the power resource utilization without affecting the performance of the entire application.

The method described above uses a decision tree-based approach to construct the power-performance model for each microservice. Namely, each microservice's power-performance model is an independent decision tree. On the decision tree, each leaf node represents the power-performance of the microservice under a certain load condition.

The steps of constructing the decision tree include:

(i) Collecting the runtime log of a microservice under different load states and power allocations.

(ii) Parsing the runtime log to obtain the input dataset of the decision tree, and dividing the input dataset into a training dataset and a test dataset.

Each row of data in the input dataset contains the load size of the microservice and the power-performance relationship under the current load state.

(iii) Using the training dataset to train the decision tree. The training process dynamically and iteratively extends the depth of the tree. In each iteration, it equally divides the load intervals of the parent node into fully omitted and mutually exclusive subintervals, namely the load intervals of the children. Then, it computes the average error value of the power-performance model for children node under the same parent node, i.e., under each load subintervals. When the error value is less than or equal to the 5%, then the iteration under that parent node is stopped. Otherwise, the next iteration is carried out instead. When the error value of the power-performance model for all the sibling nodes is less than or equal to 5%, the entire training process is completed. Otherwise, the next iteration is carried out instead.

(iv) The trained decision tree is tested using the test dataset. It compares the power-performance models computed with the tested dataset with the power-performance models calculated by the decision tree. If the error value between them is less than or equal to 5%, the power-performance model represented by the decision tree is judged to be accurate and valid. Otherwise, the power-performance model is judged to be inaccurate and the model need to be updated.

The root node of the decision tree represents the maximum load range. The load range of all leaf nodes is a division of the maximum load range, and each leaf node preserves the relationship between power-performance of the microservice under the current sub-load range.

Preferably, the different load variations of the microservices described in step (i) use the load variations of the Alibaba open source data center running dataset.

Preferably, the input dataset described in step (ii) contains 1000 data, wherein the training dataset contains 800 data and the test dataset contains 200 data.

Updating the model means to improve the accuracy of the model by updating the leaf nodes of the decision tree or by reconstructing the decision tree.

Updating the leaf node of the decision tree means to continuously calculate the average error value before the actual response time of the microservice and the response time calculated according to the model stored by the leaf node. When the error is less than or equal to 5%, the leaf node is not updated. Otherwise, the power-performance model under the leaf node is recalculated using the most recent running log of the microservice under the load interval represented by the leaf node.

The reference to reconstructing a decision tree happens when the nature of a microservice changes dramatically, i.e., the service is reconstructed or a new microservice is added. In this scenario, the decision tree is reconstructed for that microservice or the new microservice using a decision tree-based approach.

The partitioning refers to partitioning microservices into three different tiers of priority queues based on the power-performance models, thereby budgeting limited power resources in order of high priority to low priority queues of microservices. The partitioning process includes the following steps.

(i) A critical condition refers to an important boundary that one can achieve the most aggressive power reduction without violating the performance requirement. Under the critical condition, the maximum power reduction would not compromise the performance of the entire application.

The critical condition selects the maximum response time of all microservices for the entire application as the baseline time. When the power consumption decreases from maximum to minimum, and the response time changes from the minimum time to the baseline time. Thus, the critical condition is represented as the line of the relationship between critical power consumption and performance.

(ii) When the slope of the relationship between power consumption and performance of a microservice is less than the slope of the critical condition. However, as the assignable power consumption decreases, ultimately resulting in the response time greater than the baseline time, then this microservice is placed in a queue with a priority of 1, i.e., the highest priority.

(iii) When the slope of the relationship between power consumption and performance of the microservice is greater than the slope of the critical condition. However, as the allocable power consumption decreases, which ultimately results in a response time greater than the baseline time, then this portion of the microservice is placed in a queue with priority 2, i.e., the high priority.

(iv) As the allocable power consumption decreases, the response time of the microservice is always less than or equal to the baseline time. This portion of the microservice is placed in a queue with priority 3.

The agile power regulation design described in is implemented with a set of customized MSRs, a daemon process for listening to the status of the registers in real time, and a system call function for assigning power budgets to different microservices.

The customized MSRs refers to configure a homogeneous register for each hardware processing core for receiving power regulation commands and for fast power budget value transmission.

Preferably, the customized register uses a 4-bit register, where bit "0" is a dirty bit indicating whether power regulation is required. When the dirty bit state is "0", it means that the current power setting does not need to be changed. When the dirty bit state is "1", it means that the current power setting needs to be changed.

The [4:1] bits of the customized register described in save the current power regulation targets. Since the values of each processor frequency/voltage regulation are discrete, finite combinations, each value presented by the [4:1] bits can link to a different combination number.

The listening process described in includes triggering the system call process to modify the execution power consumption of the corresponding hardware processing core when the dirty bit of any one of a set of registers changes from state "0" to state "1".

The system call process described in executes the power allocation commands by calling the on-chip voltage regulation module of each hardware core. It directly writes the target power allocation value represented by the customized register [4:1] bit into a specific power management register provided by the processor, such as the IA32_PERF_STATUS_MSR register provided by the Intel processor.

The transparent mapping mechanism described in is responsible for recording and updating of operating results by implementing hardware labels and software labels. Hardware labels are used to distinguish between different microservices executing on the processor and uniquely correspond to microservices executing on the on-chip processor. Software labels are used to distinguish between different microservices in the data center and to track the survival state of the different microservices.

The hardware labels are preferably the customized registers as described above.

The software label comprises a static software label and a dynamic software label. The dynamic software label uniquely corresponds to a microservice and can be written to a container running the microservice via a container configuration file, such as a YAML file. The static software label is a dynamic software label that is kept for a long time when all containers running a microservice exit in order to avoid rebuilding the power performance model due to a reboot of the microservice.

The dynamic software label is assigned when a container running a microservice is first created. The dynamic software label can be used to query the operational state of the microservice and the power consumption performance model. Ultimately, the dynamic software label ends with the end of the lifecycle of all containers running the microservice.

These labels function as the following steps.

(i) At the start of creating a container, a dynamic software label is assigned to each microservice for each microservice whilst a decision tree of power-performance models for the microservice is obtained. A priority table is computed by querying the power-performance model of the microservice in its current state to partition the service into different priority queues. Each row in the table records the software label of the microservice and the priority and energy saving potential of the microservice.

(ii) The priority table is sent to the operating system. Then the operating system allocates and manages the power resource to each microservice based on the software label and priority level in the priority table. At scheduling, the operating system binds a microservice's software label to a hardware label and writes the target power consumption value to the [4:1] bit of a special register.

(iii) While the microservice is executing on the processor, the system call function executes the decision of how to allocate microservice's power resource.

The present invention relates to a system implementing the method described above, which comprises a power budgeting module and an agile power regulation module connected by a transparent mapping mechanism. The power budgeting module lies in the microservice management level, which is mainly responsible for collecting and storing the runtime logs of each microservice. It outputs the power budget decisions to the agile power regulation module. The agile power regulation module is connected to the on-chip voltage regulation system of the server. It implements a direct execution of the power allocation decisions by directly rewriting the on-chip voltage regulation system via the customized 4-bit register.

The runtime log includes the time-sequencing power usage of microservice, whereby the power budgeting module generates its corresponding power-performance model and makes allocation decisions.

Technical Effect

Compared to the prior art, the present invention utilizes a decision tree to automatically and accurately construct a power-performance model of a microservice. The power-performance models help to proactively quantify the energy-saving potential of each microservice. They also help to mine and distinguish the differences between power consumption and performance of different microservices through a three-level priority queue, thereby realizing fast power budgeting for each microservice. On the other hand, the present invention employs a customized register. With the customized register, the invention can directly control the on-chip voltage regulation module through a daemon process and a system call function to rapidly execute the power allocation decisions. Meanwhile, the invention adopts a software tagging mechanism to track and distinguish the state of different microservices in the cloud environment. It mainly uses hardware tags to distinguish the actual execution and power allocation process of different microservices to realize the power budgeting and power management of microservices. Ultimately, the advantages of this implementation and of existing data center power management techniques in terms of power consumption and performance are measured by Energy Delay Product (EDP).

DETAILED DESCRIPTION OF THE INVENTION

Figure 5:
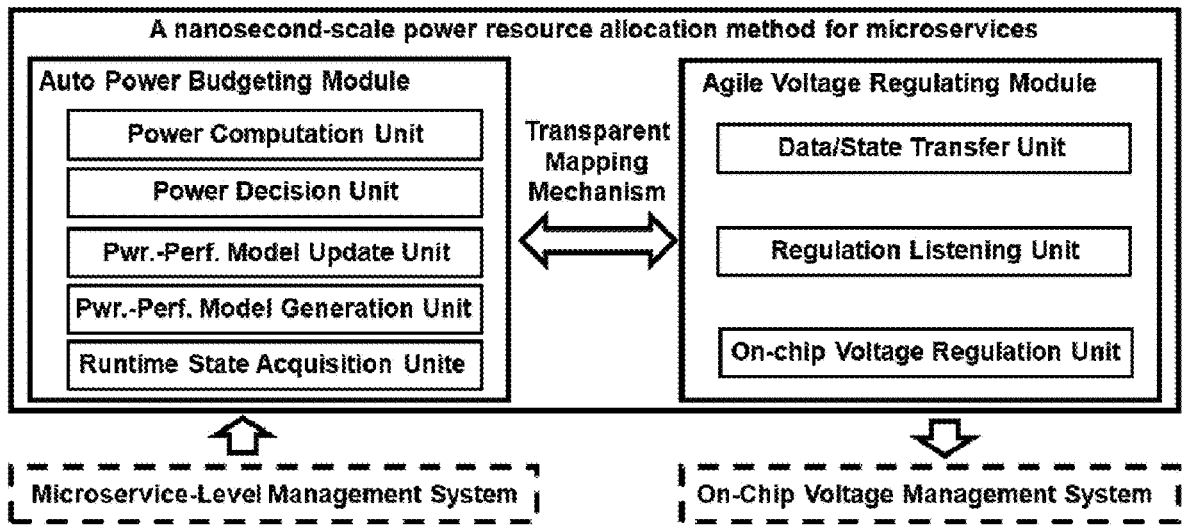
FIG. 5 is a modular diagram of the present invention.

As shown in FIG. 5, the present embodiment relates to a microservice-oriented power allocation system in data centers. It includes an auto power budgeting module and an agile power regulation module connected via a transparent mapping mechanism.

The auto power budgeting module includes a microservice state acquisition unit, a power-performance model generation unit, a power-performance model update unit, a power allocation decision module, and a power calculation unit. The microservice state acquisition unite provides an interface for interaction with a microservice-level management system for assigning a software tag to the microservice, monitoring and storing the load state as well as running logs of the microservice in real time. The power-performance model generation unit and the update unit are used to leverage the runtime logs of the microservice to generate its unique decision tree, which represents the power-performance model. It is also used to decide how to update or rebuild the decision tree. The power allocation decision and computation unit are used to distinguish the most influential microservices, assign the microservices to different priority queues, and allocate the limited power resources according to the priority of different microservices.

The power-performance model generation unit processes the microservice runtime log and generates a decision tree for presenting the power-performance model. It includes the following operations.

(i) Processing the microservice runtime log collected by the microservice state acquisition unit to generate the input dataset of the decision tree. The input data set includes a total of 1000 lines. Each line of data including a load size of the microservice and a relationship between power consumption and performance under the current load state. The input dataset is divided into two parts, the training dataset and the test dataset, where the training dataset includes 800 input data and the test dataset includes 200 input data.

(ii) The decision tree is trained using the training dataset obtained in step (i), thereby dynamically and iteratively expanding the depth of the tree. The child nodes generated during each iteration divide the load intervals of the parent node equally into fully omitted and mutually exclusive subintervals. It compares the average error value of the power-performance models of the sibling child nodes under the same parent node, i.e., under each load subinterval. When the error value is less than or equal to 5%, the iteration under that parent node is stopped, otherwise, the next round of iteration is carried out instead. When the error value of the relationship between power-performance is less than or equal to 5% for all the sibling child nodes, the entire training process ends, otherwise the next iterations is carried out instead.

(iii) Using the test dataset obtained in step (ii) to test the decision tree generated by process (ii). The testing process compare the power-performance models calculated by the decision tree and the one generated from the test dataset. If the average error value between them is less than 5%, the power-performance model represented by the decision tree is accurate and valid. When the error is greater than 5%, the power-performance model is inaccurate and the decision tree needs to be updated.

(iv) A decision tree representing the power-performance model of the microservice is generated according to steps (i)-(iii). The root node of the decision tree represents the maximum load range. The load range of all leaf nodes is a division of the maximum load range. Each leaf node preserves the power-performance of the microservice under the current sub-load range.

The power-performance model update unite updates the leaf nodes when the model is inaccurate. It also rebuilds the decision tree when a microservice is added. The update process is as follows.

(i) It continuously calculates the average error value before the actual response time of the microservice and the response time calculated according to the model stored by the leaf node, and does not update the leaf node when the error is less than or equal to 5%.

(ii) When the error is greater than 5%, the power-performance model under that leaf node is recalculated using the most recent runtime log of the microservice under the load range.

(iii) When a microservice changes dramatically, i.e., the service is reconfigured or a new microservice is added, the decision tree is reconstructed for that microservice or the new microservice.

Figure 1:
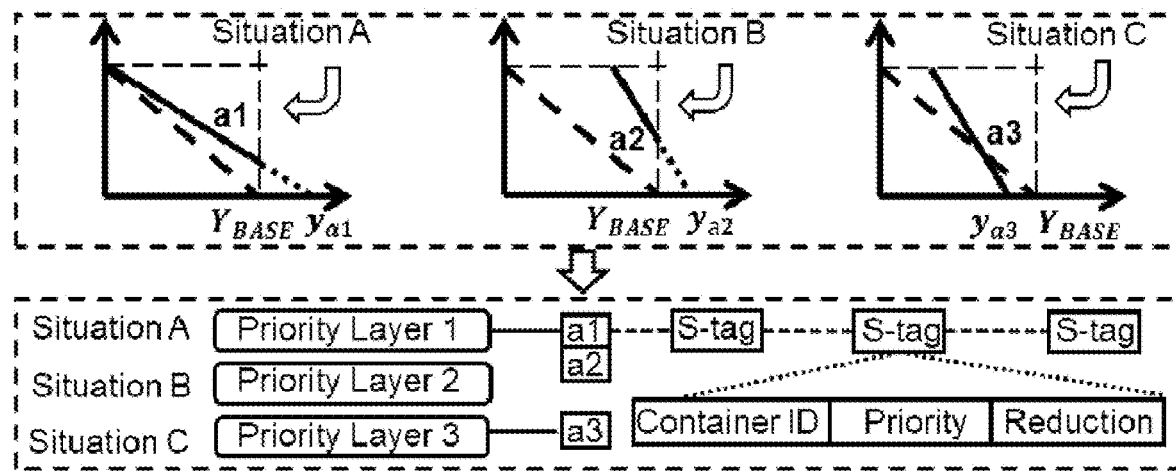
FIG. 1 is the mechanism used by the present invention to classify the priority of microservices.
Figure 2:
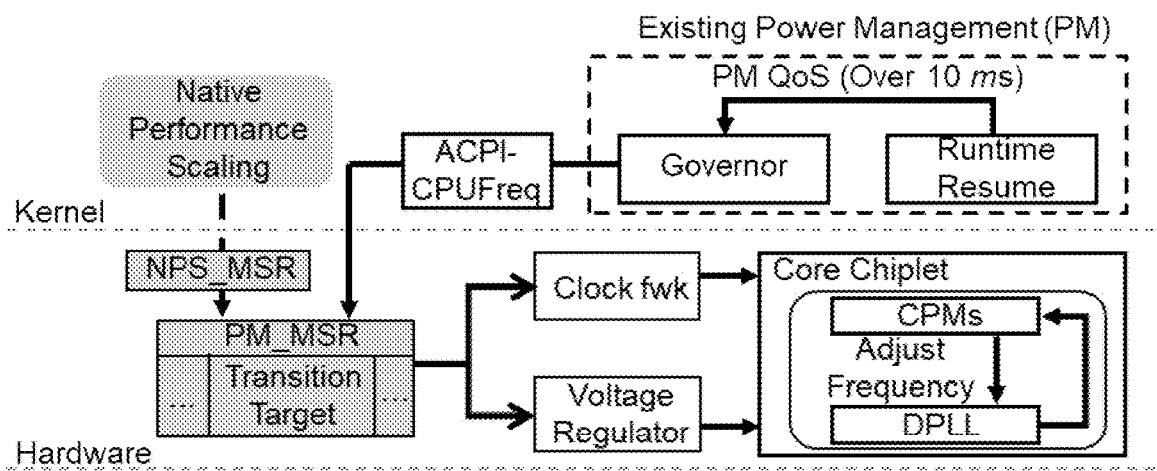
FIG. 2 is a schematic diagram of the invention performing the agile power regulation.
Figure 3:
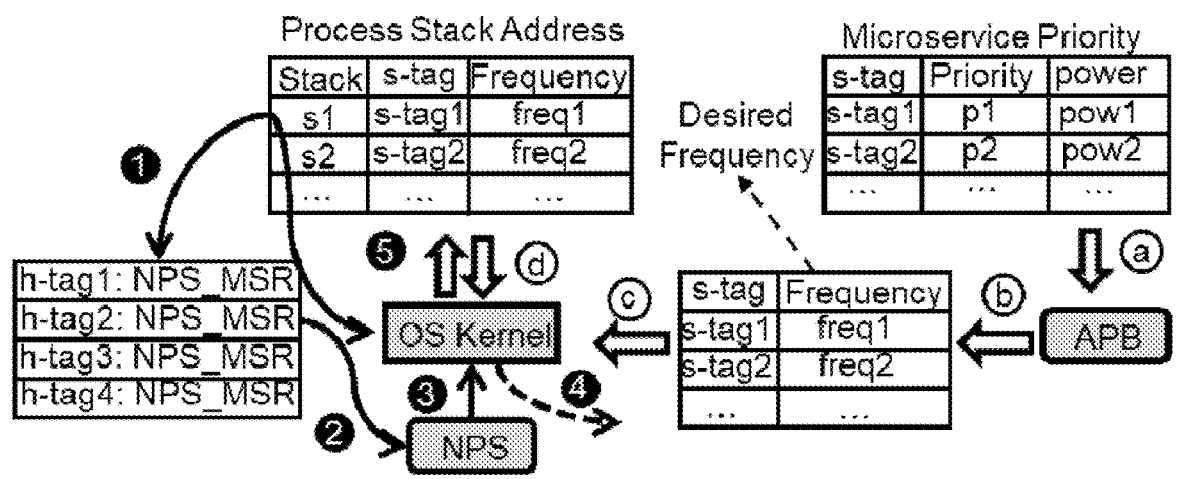
FIG. 3 is a diagram of the entire control process of the invention.

The power consumption decision unit classifies the microservices into a three-level priority queue by comparing them to (as shown in FIG. 1) critical conditions according to the following steps.

(i) In the first condition, the slope of the relationship between power and performance of the microservice is less than the slope of the critical condition. As the power decreases, the response time of the microservice is greater than the baseline time, then the microservice is placed in a queue with priority 1.

(ii) In the second condition, the slope of the relationship between power consumption and performance of the microservice is greater than the slope of the critical condition. As the power decreases, The response time is greater than the baseline time, then the microservice is placed in the queue with priority 2.

(iii) In the third condition, as the power decreases, the response time of the microservice is always less than or equal to the benchmark time, then the microservice is placed in a queue with priority 3.

The power allocation unit prioritizes the allocation of limited power resources to microservices in the priority 1 queue to meet their more stringent performance requirements. It finally to microservices in the priority 3 queue to provide maximum energy-saving space.

The agile power regulation module comprises an on-chip voltage modulator control module, a power regulation request listening module, and a data/state transfer module. The on-chip voltage modulator control module writes a target power consumption setting directly into a register related to the on-chip voltage regulation system of the server via a system call. It is mainly responsible for realizing the direct execution of a power allocation process bypassing the control of power management at the system layer. The power regulation request listening module queries in real time whether power regulation is required for a currently executed microservice by checking the status of the data/state transfer module.

Figure 4:
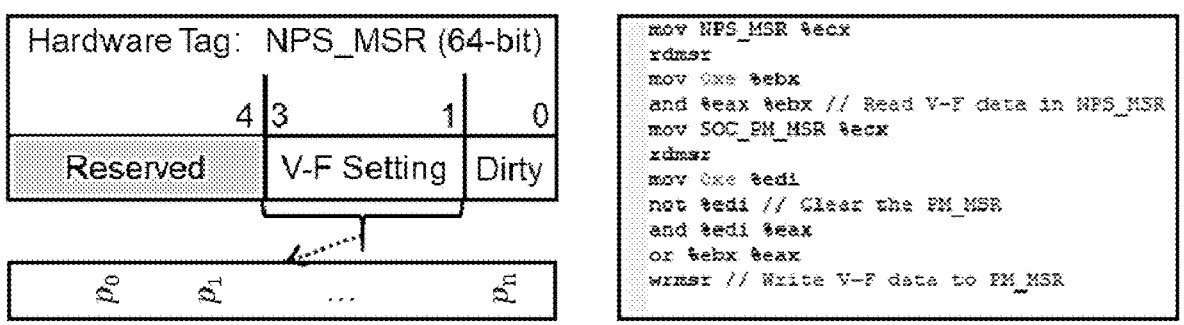
FIG. 4 shows the architecture of the customized register and the code of the system call function.

The data/state transfer module is implemented by means of a specially crafted register based on the register shown in FIG. 4. It is mainly responsible for communicating a power regulation target and for notifying whether power regulation is required. It uses bit "0" to represent a dirty bit for notifying whether power regulation is required. When the dirty bit state is "0", it means that the current power setting does not need to be changed. When the dirty bit state is "1", it means that the current power setting needs to be changed. The current need for power regulation is saved using bit [4:1]. Each value of the [4:1] bit may represent a different power setting.

The transparent mapping mechanism unit coordinates the work between the auto power budgeting module and the agile power regulation module using hardware and software tags. It mainly includes:

(i) assigning a dynamic software label to a microservice via a container configuration file, such as a YAML fil when a container running the microservice is first created. The software tag is a unique value that identifies a microservice, through which the operating state of the microservice and the power performance model can be queried.

(ii) when all containers running a microservice exit, the dynamic software label, also referred to as the static software label, is kept for a long time in order to avoid the reconstruction of the power consumption performance model due to the restart of the microservice.

(iii) A unique hardware label is assigned when the microservice is executed on the on-chip processor, the hardware label is used to distinguish and manage the execution of different microservices on the processor, the hardware label is the set of registers described.

Figure 6:
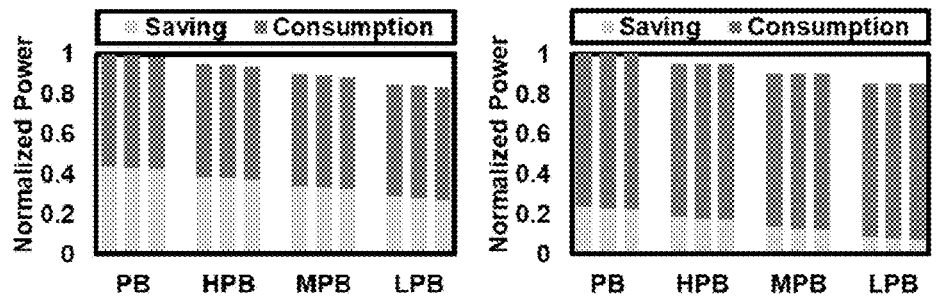
FIGS. 6 and 7 are diagrams of embodiments.
Figure 7:
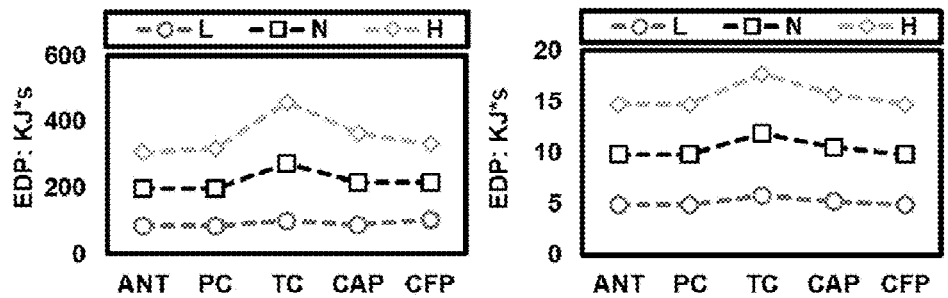

As shown in FIG. 6 and FIG. 7, we test the invention with two microservice benchmarks, i.e., an industrial microservice test application named TrainTicket, and an academic microservice test set named SocialNetwork. We analyze the proposed invention in different cases, i.e., the power consumed and the energy saved by the method in different electrical cases as shown in FIG. 6. PB, HPB, MPB, and LPB means to provide utility power according to the 100%, 90%, 85% and 80% of nameplate power. The result shows that the implementation is able to save more than 20% of energy under the TrainTicket and more than 10% of energy under the SocialNetwork. FIG. 7 compares the advantages of the implementation and the existing data center power management techniques in terms of power consumption and performance through the energy consumption delayed output (EDP: Energy Delay Product) for measurement.

The five technical schemes in FIG. 7 are indicated as: (a) CAP is a representative peak power management technique similar to prior work, which only scales down the overall servers' active power to shave peak power. PC represents a group of application-aware schemes that only allocates power in accordance with individual power consumption. Instead, TC is an approach based on the response delay or tail latency of each application. CFP consider the profile of performance and power, but they neglect the dynamic changes of application execution states. ANT is the proposed invention as described above.

As can be seen from the above data, the invention provides a lower EDP, i.e., a better power-to-performance advantage can be ensured, compared to other schemes, for the same power supply.

The above embodiments may be partially adjusted by those skilled in the art in different ways without departing from the principles and purposes of the present invention, and the scope of protection of the present invention is subject to and not limited by the above embodiments, and each implementation within the scope thereof is subject to the present invention.

What is claimed is:

1. A method for allocating microservice-oriented nanosecond power resource, wherein the method comprising: leveraging an auto power budgeting module which distributes the limited power resource to each microservice according to its power-performance model while deploys an agile power regulation module that bypasses power management and control procedures at a server system layer; invoking an on-chip voltage regulation circuit to execute power allocation decisions for each microservice; finally, coordinating the auto power budgeting module and the agile voltage regulation module to achieve optimal power allocation through a transparent mapping mechanism;

the auto power budgeting module includes creating a power-performance model to describe performance of different microservices in a dynamic environment; the power-performance model reflects relationship between a response time and an allocated power consumption, which quantify variability of power allocation of the different microservices, which allocates power resources to most influential microservices that prioritizes power resource budget for the most influential microservices, which maximize power resource utilization without affecting performance of entire application;

the agile power regulation module is implemented with a set of customized registers, a daemon process for listening to status of the registers in real time, and a system call function for assigning power budgets to the different microservices;

the transparent mapping mechanism enables recording and updating of tuning results by means of hardware labels and software labels; hardware labels are used to identify the different microservices executing on a processor; software labels are used to distinguish the different microservices in data center and to track running status of the different microservices.

2. The method according to claim 1, wherein the method further comprising: leveraging a decision tree-based approach to construct a power-performance model for each microservice, a power-performance model for each microservice is an independent decision tree; each leaf node of a decision tree represents a relationship between power consumption and performance of the microservice under a certain load condition; the decision tree is constructed as the following steps:

(1) collecting and storing logs of operation of a microservice under different load states and different power consumption;

(2) parsing the runtime log to obtain input dataset for the decision tree and dividing the input dataset into a training dataset and a test dataset;

(3) the training process iteratively expands the depth of the tree, specifically, each iteration generates a child node that divides load interval of parent node evenly into mutually exclusive subintervals, then, calculating average error value of the power-performance model for sibling node under same parent node; when the error value is less than or equal to 5%, the iteration under the parent node stops, otherwise next iteration happens; when the error value of the power-performance model for all the sibling nodes is less than or equal to 5%, the entire training process ends, otherwise, the next iteration happens;

(4) using the test dataset to test the trained decision tree: comparing average error between the power-performance model under a load in the test dataset and the power-performance model calculated by the decision tree; if the error value is less than or equal to 5%, the power-performance model represented by the decision tree is judged to be accurate and effective;

otherwise, the power-performance model is judged to be inaccurate and the decision tree needs to be updated;

the root node of the described decision tree represents a maximum load interval; load interval of all leaf nodes is a division of the maximum load interval; each leaf node preserves the power-performance model for the microservice under current sub-interval.

3. The method according to claim 2, wherein updating the decision tree to improve the accuracy of the power-performance model by updating the leaf nodes or by reconstructing the decision tree;

the process of updating the leaf node of the decision tree is as follows: comparing actual response time of the microservice and the response time calculated according to the model stored in the leaf node; if the error is less than or equal to 5%, failing to update the leaf node; otherwise, recalculating the power-performance model stored in the leaf node using most recent running log under the load interval represented by that leaf node;

the reconstructed decision tree refers to: when the nature of a microservice changes dramatically, the service is reconfigured or a new microservice is added, the decision tree is reconstructed for the microservice or the new microservice using a decision tree-based method.

4. The method according to claim 2, wherein partitioning the microservice into three types of priority queues based on the power-performance model, thereby budgeting the limited power resources in an order of high priority to low priority queues of the microservice, which includes:

(1) determining the critical condition for the power-performance relationship: a microservice provides the greatest power reduction and energy savings potential fails to cause overall application performance to suffer;

(2) when slope of relationship between power consumption and performance of a microservice is less than slope of critical condition that resulting in a response time greater than baseline time as allocable power consumption decreases, then this microservice is placed in the queue with priority 1 that is a highest priority;

(3) when the slope of the relationship between power consumption and performance of a microservice is greater than the slope of the critical condition that leads to a response time greater than the baseline time as the allocable power consumption decreases, then this microservice is placed in a queue with priority 2;

(4) the response time of the microservices is always less than or equal to the baseline time as assignable power consumption decreases, then these microservices are placed in a queue with priority 3.

5. The method according to claim 4, characterized in that the critical condition is determined by selecting maximum response time of all microservices for entire application as the baseline time, the power consumption decreases from maximum to minimum, and straight line of change of the response time from 0 to the baseline time is a line of relationship between the critical power consumption and the performance that is the critical condition.

6. The method according to claim 1, characterized by an agile power regulation design by setting a set of registers, a background process for listening to status of the registers in real time, and a system call process for assigning the power budget to the different microservices; setting the set of registers as configuring a homogeneous set of registers for each hardware processing core of the processor for receiving power regulation messages and for fast power budget value transmission.

7. The method according to claim 6, characterized by use of a 4-bit register, wherein the bit "0" is a dirty bit indicating whether power regulation is required, and when the dirty bit state is 0, the current power setting remains same; when the dirty bit state is 1, the current power setting needs to be changed;

the listening refers are triggering a system call process to modify execution power consumption of corresponding hardware processing core when the dirty bit of any one of a set of registers changes from a 0 state to a 1 state.

8. The method according to claim 1, characterized in that the transparent mapping mechanism enables the recording and updating of adjustment results by means of a hardware label and a software label, wherein: the hardware label is used to distinguish execution process of the different microservices on the processor and uniquely corresponds to microservices executing on on-chip processor, and the software label is used to distinguish the different microservices in the data center and to track the survival state of the different microservices.

9. The method according to claim 8, characterized in that the software label includes a static software label and a dynamic software label, wherein: the dynamic software label uniquely corresponds to a microservice and can be written to a container running the microservice via a container configuration file, such as a YAML (Yet Another Markup Language) file, and the static software label is a dynamic software label that is kept for a long period of time when all containers running a microservice exit in order to avoid rebuilding the power performance model due to a reboot of the microservice;

the lifecycle of the dynamic software label that is a dynamic software label is assigned when a container running the microservice is first created; the dynamic software label can be used to query the operating state of the microservice and the power consumption performance model;

and ultimately, the dynamic software label ends with the end of the lifecycle of all containers running the microservice.

10. The method according to claim 1, wherein logging and updating the labels is as follows:

(1) creating a container for each microservice by assigning a dynamic software label to each microservice and obtaining a decision tree between the power consumption and performance of the microservice; assign the service to different priority queues by querying the power performance model of the microservice in its current state and compute a priority table with each row of the table recording the software label of the microservice as well as the priority and energy saving potential of the microservice;

(2) sending the priority table to an operating system, and the operating system allocates and manages the power consumption allocated during execution of the microservice based on the software label and priority in the priority table; during scheduling, the operating system binds the software label of a microservice to a hardware label and writes the target power consumption value into the [4:1] bit of a special register;

when the microservice is executed on the processor, the operating system call process performs the power consumption allocated by the microservice.

11. A system for allocating microservice-oriented nanosecond power resource, characterized in that it includes: an auto power budgeting circuit and an agile power regulation circuit connected to it through a transparent mapping mechanism, wherein: the power budgeting circuit is connected to the microservice management level and collects and saves the operation log of each microservice, and outputs the power budget results to the agile power regulation circuit; the agile power regulation circuit is connected to the on-chip voltage regulation system of the server, and directly overrides the relevant registers of the on-chip voltage regulation system through a specially designed 4-bit register to directly execute the power allocation process;

the transparent mapping mechanism unit described above uses hardware and software labels to coordinate the work between the auto power budgeting circuit and the agile power regulation circuit described above;

the run log includes: the runtime and power consumed by each microservice, whereby the power budgeting circuit generates its corresponding power consumption-performance model and the allocable power.

12. The system according to claim 11, characterized in that the auto power budgeting circuit comprises: a microservice state acquisition apparatus, a power consumption-performance model generation circuit, a power consumption-performance model update circuit, a power consumption decision-making circuit, and a power consumption calculation circuit, wherein: the microservice state acquisition apparatus provides an interface for interaction with a microservice-level management system for assigning a software tag to the microservice, monitoring the microservice in real time, and a power consumption calculation circuit, wherein: the microservice state acquisition apparatus provides an interface for interaction with a microservice-level management system for assigning a software tag to the microservice, monitoring the microservice-level management system in real time, and a power consumption circuit, wherein: the microservice state acquisition apparatus provides an interface for interaction with a microservice-level management system for assigning a software tag to the microservice, monitoring the microservice-level management system in real time, and a power consumption calculation circuit; wherein the power consumption decision and computation circuit is used to distinguish the most influential microservices and divide microservices into different priority queues; priorities of the different microservices are assigned.

13. The system according to claim 11, characterized in that the agile power regulation circuit includes: an on-chip voltage modulator control circuit, a power regulation request listening circuit, and a data and state transfer circuit, wherein: the on-chip voltage modulator control circuit writes the target power consumption setting directly into the relevant registers of the on-chip voltage regulation system of the server via a system call, thereby bypassing the system layer; the power regulation request listener circuit directly performs the power allocation process by controlling the power modulation; the power regulation request listener circuit queries in real time whether the power regulation is required for the currently executed microservice by checking the state of the data and state transfer circuit.

* * * * *